US011852533B2

(12) United States Patent
Sutherland et al.

(10) Patent No.: US 11,852,533 B2
(45) Date of Patent: Dec. 26, 2023

(54) EXPLOSION-PROOF AND FLAMEPROOF ENCLOSURE FOR RAMAN SYSTEMS

(71) Applicant: Kaiser Optical Systems Inc., Ann Arbor, MI (US)

(72) Inventors: Scott Sutherland, Spring, TX (US); Manfred Jagiella, Notzingen (DE); Joseph Slater, Dexter, MI (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 0 days.

(21) Appl. No.: 17/551,362

(22) Filed: Dec. 15, 2021

(65) Prior Publication Data

US 2022/0196473 A1   Jun. 23, 2022

Related U.S. Application Data

(60) Provisional application No. 63/127,522, filed on Dec. 18, 2020.

(51) Int. Cl.
  *G01J 3/44*    (2006.01)
  *G01J 3/02*    (2006.01)
(52) U.S. Cl.
  CPC .......... *G01J 3/0291* (2013.01); *G01J 3/0218* (2013.01); *G01J 3/0286* (2013.01); *G01J 3/44* (2013.01)
(58) Field of Classification Search
  CPC ...... G01J 3/0291; G01J 3/0218; G01J 3/0286; G01J 3/44
  See application file for complete search history.

(56) References Cited

U.S. PATENT DOCUMENTS

| 4,575,629 A | * | 3/1986 | Schnell | ..................... G01J 3/44 |
| | | | | 62/51.1 |
| 6,028,667 A | * | 2/2000 | Smith | ....................... G01J 3/02 |
| | | | | 356/301 |

(Continued)

FOREIGN PATENT DOCUMENTS

| CN | 202903679 U | 4/2013 |
| CN | 206788042 U | 12/2017 |

(Continued)

OTHER PUBLICATIONS

Machine Translation of CN 208366851 (Generated on Jan. 10, 2023) (Year: 2023).*
English Machine translation of CN208366851 (Year: 2019).*

*Primary Examiner* — Abdullahi Nur
(74) *Attorney, Agent, or Firm* — Christopher R. Powers; Endress+Hauser (USA) Holding, Inc.

(57) ABSTRACT

Raman analysis systems are partitioned to provide for cost-effective flame resistance and explosion resistance, including relatively small enclosures associated with particular subsystems. One or more of an excitation source, spectrograph and/or controller are disposed in separate, flame-resistant or explosion-resistant enclosures. A remote optical measurement probe may also be disposed in a separate flame-resistant or explosion-resistant enclosure. A grating and a detector of the spectrograph may be disposed in separate enclosures, with sealed windows therebetween to deliver a Raman spectral signal from the optical grating to the detector. The sealed window of the detector enclosure may serve the dual purpose of maintaining flame resistance or explosion resistance while maintaining cooling within the enclosure. Wireless interfaces may be used for communications between the enclosures where practical to reduce or eliminate physical electrical feedthroughs.

11 Claims, 2 Drawing Sheets

(56) References Cited

U.S. PATENT DOCUMENTS

| | | | |
|---|---|---|---|
| 6,734,963 B2* | 5/2004 | Gamble | G01N 21/65 356/73 |
| 7,158,225 B2 | 1/2007 | Tedesco et al. | |
| 10,429,307 B2* | 10/2019 | Jagiella | G01J 3/108 |
| 10,753,805 B2 | 8/2020 | Slater et al. | |
| 2002/0113961 A1 | 8/2002 | Gamble et al. | |
| 2017/0184503 A1 | 6/2017 | Ning et al. | |
| 2018/0031482 A1 | 2/2018 | Jagiella et al. | |
| 2020/0141799 A1 | 5/2020 | Alon et al. | |

FOREIGN PATENT DOCUMENTS

| | | | |
|---|---|---|---|
| CN | 208366851 U | * | 1/2019 |
| CN | 208366851 U | | 1/2019 |

* cited by examiner

EXPLOSION-PROOF AND FLAMEPROOF ENCLOSURE FOR RAMAN SYSTEMS

TECHNICAL FIELD

The present disclosure generally relates to explosion-proof and flameproof enclosures for spectroscopic systems for use in hazardous areas.

BACKGROUND

Induced radiative effects such as Raman scattering and fluorescence have become extremely valuable tools associated with the non-destructive determination of molecular constituents. Raman spectroscopy is an established and practical method of chemical analysis and characterization applicable to many different chemical species.

Raman spectroscopy is gaining increasing acceptance in on-line process monitoring, due in large part to developments in instrumentation and associated component technologies. For a number of process applications, Raman spectroscopic analyzers have demonstrated significant advantages over alternative techniques such as gas chromatography, IR spectroscopy and NIR spectroscopy. As a non-destructive, real-time technique, Raman spectroscopy is compatible with a wide variety of samples including opaque solids, aqueous solutions, emulsions, and gases, without the need for sample preparation.

There are three primary components to a Raman analysis system: an excitation source, a sampling apparatus and a detector. While these three components have come in varying forms over the years, modern Raman instrumentation commonly uses a laser as the excitation source, a spectrometer (i.e., spectrograph) for the detector, and either a microscope or fiber optic probe for the sampling apparatus. Complete systems conventionally further include a computer processor executing analysis software.

To characterize a composition in a remote or hostile environment, optical fibers are advantageously used to deliver excitation energy to a sample under investigation and to carry scattered radiation back to instrumentation for spectral analysis. The excitation laser, providing stimulus at a suitable wavelength, is coupled to an input fiber, and the collection path typically includes a second fiber carrying return radiative information to a spectrograph.

In some instances, fiber optic Raman probes may be located significant distances from other equipment. Such installations are increasingly used in industrial applications for materials processing, process monitoring and process control. As an example, industrial Raman spectroscopy for chemical process monitoring and control may use laser energy from an excitation source installed in a central control room instrument. Such an instrument couples the laser energy into an optical fiber cable that is routed to a remote probe head. The remote probe head may be installed in a pipeline, process vessel or other locations that may be hundreds of meters away from the laser source, for example.

Modern Raman instruments may also be configured to monitor multiple sample points in a process. In a conventional industrial installation, multiple remote probe heads may be coupled to a central instrument via separate fiber optic cables. Such a central instrument may house a laser source, spectrograph, a detector (e.g., a charge-coupled device (CCD)) and control electronics. For example, U.S. Pat. No. 7,158,225, incorporated herein by reference, describes a multi-channel, fiber-coupled Raman instrument providing multiple possible configurations using basic building blocks in the form of laser sources, probe heads/optics, fiber switches and other features.

Raman signals are inherently very weak. To reliably acquire Raman signals, relatively high-power lasers are commonly used for excitation, with ratings in the range of one watt and higher. Numerous wavelengths may be used effectively for Raman spectroscopy, ranging from ultraviolet (UV) into the near-infrared (near-IR or NIR). In the 1990s, only high-power gas lasers were suitable to Raman spectrometry. More recently solid-state lasers (e.g., DPSS, diode-pumped solid-state) have spectral characteristics that are compatible with Raman spectroscopy.

A common near-IR wavelength for Raman spectroscopy is 785 nm, which has a concentrated energy distribution when focused. Under certain operating conditions, and over time, this energy distribution can cause deflagration and combustion of inflammable and explosively dangerous substances being monitored. Published U.S. Patent Application Publication No. 20170184503 discloses a safety protection device for Raman spectroscopy detection comprising a detection cavity and a cover forming an explosion-proof container defining a space for receiving a sample to be detected. A detection instrument, such as a Raman detection probe, is insertable into the space such that, if dangerous conditions such as deflagration and explosion of inflammable, explosive substances occur during detection, these dangerous conditions can be restricted within the explosion-proof container and be effectively prevented from causing injury to an operator or damage to an on-site detection operation.

However, the effectiveness of the above-mentioned safety protection device notwithstanding, such a device appears to be limited to individually loaded solid or powder samples and is not applicable or suitable to on-line process monitoring and control. Further, the device is engineered only for the very tip of the Raman probe and does not address other aspects of the Raman system further upstream, including the laser excitation source or other subsystems.

Accordingly, there remains a need for further contributions in this area of technology.

SUMMARY

The present disclosure includes apparatuses and methods for partitioning Raman analysis systems to provide for cost-effective flame resistance and explosion resistance. Exemplary embodiments include the judicious use of smaller enclosures associated with particular subsystems, depending upon the target application, taking into account the required enclosure size, the need for optical and/or electrical feedthroughs, and the type and level of energy content.

Raman analysis systems according to the present disclosure include an excitation energy source (e.g., a laser) emitting excitation radiation, optical apparatus (e.g., lenses, filters, sealed windows, optical fibers and complementary connectors configured to enable the functionalities described herein) operative to convey the excitation radiation to a sample under investigation and to convey optical energy collected from the sample to a spectrograph, and a controller to receive electrical signals from the spectrograph to display or store a Raman spectrum radiated from the sample. In accordance with embodiments of the present disclosure, one or more of the energy source, spectrograph and controller are disposed in separate, flame-resistant or explosion-resistant enclosures.

The spectrograph may include an optical grating operative to separate optical energy collected from the sample into a Raman spectral signal, and the spectrograph may include a detector for receiving the Raman spectral signal and converting the spectral signal into an electrical signal for transmission to the controller. In certain embodiments, at least a portion of the spectrograph may be disposed in a flame-resistant or explosion-resistant enclosure separate from other components of the Raman analysis system. For example, the grating and the detector may be disposed in separate enclosures.

In accordance with a further embodiment, the optical grating of the spectrograph may be disposed in a first enclosure including a first sealed window, with the detector of the spectrograph being disposed in a second enclosure including a second sealed window. In such a configuration, the Raman spectral signal from the optical grating may be transmitted to the detector through the first and second sealed windows.

According to at least one embodiment the present disclosure, the Raman analysis system may further include a remote optical measurement probe. In such embodiments, an excitation optical fiber carries excitation radiation from the laser to the remote probe head, and a collection optical fiber carries the collected optical energy from the remote optical probe head to the spectrograph. In accordance with the present disclosure, an optical feedthrough may penetrate the flame-resistant or explosion-resistant enclosure containing the spectrograph to deliver the optical energy collected from the sample to the optical grating while maintaining the flame-resistance or explosion-resistance of the enclosure. In embodiments, the system may further include an electrical feedthrough to deliver the electrical signal from the detector of the spectrograph to the controller while maintaining the flame-resistance or explosion-resistance of the enclosure.

In at least one embodiment, a thermoelectric cooler (e.g., a Peltier-type device), other solid-state cooling device, or other suitable cooling device or method may be disposed in the second enclosure for the purpose of cooling the detector to reduce thermally induced noise. Conveniently, the second sealed window may serve the dual purpose of maintaining the flame resistance or explosion resistance of the second enclosure, while maintaining the cooling within the second enclosure. A first electrical feedthrough may penetrate the second enclosure to provide electrical signals to control the cooling device, and a second electrical feedthrough may penetrate the second enclosure to deliver the electrical signals from the detector to the controller.

Embodiments of the present disclosure may employ wireless communications to reduce or eliminate the number of electrical feedthroughs. For example, a wireless communications transmitter may be used to deliver a wireless signal representative of the electrical signals from the detector to the controller. In further embodiments, one or more of the energy source, spectrograph and controller may be disposed in separate, flame-resistant or explosion-resistant enclosures, wherein wireless interfaces are used for communications between the various enclosures where practical to reduce or eliminate physical electrical feedthroughs. In embodiments, the remote optical measurement probe may also be disposed in a separate flame-resistant or explosion-resistant enclosure.

In at least one embodiment of the present disclosure, the system is adapted such that the excitation source is disposed within another flame-resistant or explosion-resistant enclosure, which includes a window and optics configured to convey the excitation radiation to the sample under investigation. In certain embodiments, system further comprises a remote optical probe head configured to collect the optical energy from the sample and disposed within another flame-resistant or explosion-resistant enclosure, which includes a window configured to convey the collected optical energy from the probe head to the spectrograph. In at least one embodiment, the excitation source and the controller are disposed within a common flame-resistant or explosion-resistant enclosure.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

Figure 1:
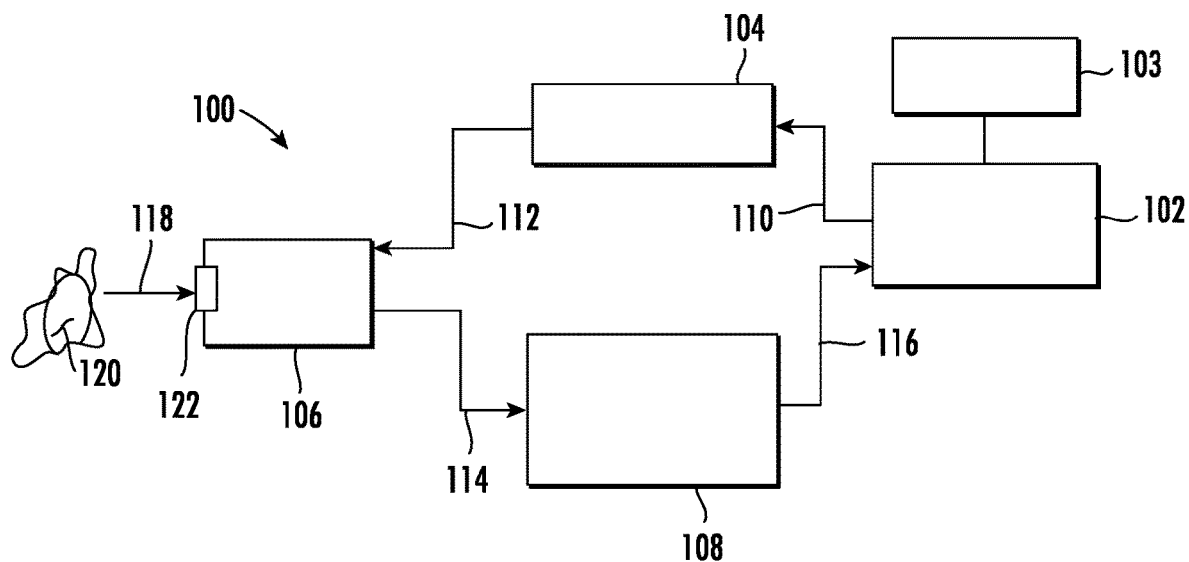
FIG. 1 shows a schematic illustration of a Raman spectroscopic system according to the present disclosure.

As depicted by the so-called "combustion triangle" or "fire triangle," three elements must be present for an explosion to occur: heat (or some other ignition source), fuel and an oxidizing agent (usually oxygen). Moreover, the fuel and oxygen must be in the correct mixture. Too little fuel (i.e., a lean mixture) or too much fuel (i.e., a rich mixture) may not ignite. These explosive limits are defined as the "lower explosive limit" (LEL) and the "upper explosive limit" (UEL).

Various industry protection standards exist with respect to equipment design for potentially explosive and/or inflammable environments, including the North American standard ANSI/UL1203 and the international standard IEC 60079-1. The ANSI standard addresses Explosion-Proof and Dust-Ignition-Proof Electrical Equipment for Use in Hazardous (Classified) Locations, and IEC standard covers Equipment Protection by Flameproof Enclosures "d" (commonly referred to as "Ex-d" for explosion protection—pressure-resistant encapsulation). Other industry standards in this field include Europe's EN 60079-1, Canada Standards Association (CSA) 60079-1, and C22.2 No. 30 Explosion-Proof Enclosures for Use in Class I Hazardous Locations. The present disclosure may refer to these, and other recognized protection standards known to those skilled in the art, collectively as protection standards. The present disclosure may further refer to aspects of the systems and structures disclosed herein as explosion-proof and/or flame-proof, meaning that the described structure meets the requirements of one or more known protection standards. For the purposes of the present disclosure, explosion-proof and flame-proof may be used interchangeably to indicate that the described structure meets the requirements of one or more known protection standards.

In contrast to "inherently safe" techniques, wherein safety faults prevent ignition or explosion from occurring in the first place, explosion-proof techniques recognize that ignition may occur and, so, are directed to explosion containment instead. Such equipment is designed to anticipate an explosion may happen but to limit an explosion of flame within the confinement of a defined area. This requires the construction of enclosures using high-strength materials, such as steel or aluminum, that have the ability to contain an explosion.

To meet industry protection standards, explosion-proof enclosures must be capable of withstanding an explosion caused by sparking contacts of devices, high temperatures and/or electrical faults. Such enclosures are designed such that hot gases generated by an internal explosion are cooled below the ignition temperature of the surrounding flammable atmosphere as they escape through the joints of the enclosure unit. Explosion-proof enclosures must be tested to ensure the enclosure will not rupture as a result of an internal explosion. In addition, the external surfaces of the enclosure must not become hot enough to ignite the surrounding atmosphere due to heat energy within the unit. Such heat energy may be the result of normal operation of heat-producing equipment within the enclosure or of an electrical fault, for example.

The most commonly used materials for explosion-proof enclosures are metals such as cast aluminum and steel, including stainless steel. As such, these enclosures tend to be bulky and heavy. Due to the heavy weight of such enclosures, there may be complications during the installation of the system. Servicing of such enclosures should only be performed by trained personnel using proper tools. Because the mechanical integrity of the system determines its safety, if inspections are not done on the set times, safety may be compromised. Moreover, implementation of any changes to conventional systems can be difficult to execute.

Perhaps as important, the steel or aluminum materials used to make the enclosures are expensive, and their costs increase in a non-linear fashion. Generally, as the explosion-proof volume doubles, cost may be much more than twice as expensive. One of the reasons is that, as the enclosed volume increases, wall thickness must increase at a higher rate to ensure containment. Essentially the walls of the enclosure must have the ability to allow for cooling of the flame front within the enclosure to guard against ignition of surrounding materials or the ambient environment. This scaling does have limits, however, as overly thick walls may crack under pressure and compromise protection.

The terms "explosion-proof" and "flameproof" may have the same meaning in the sense that applicable equipment is constructed such that an internal ignition of a flammable atmosphere will not be transmitted outside of the enclosure, thereby preventing the ignition of surrounding flammable materials. Devices that operate in these potentially explosive environments, and which contain or may form ignition sources, need to be enclosed such that safe operation can be ensured. In practical applications, this is effected with flameproof enclosures that safely enclose an explosion resulting from the ignition of an explosive gas mixture admitted into the enclosure such that neither flames nor glowing particles can escape the enclosure.

Flameproof is a preferred method of protection when the equipment may potentially have high energy arcing or sparking components in normal operation and, therefore, the formation of an explosion when in a hazardous atmosphere is not easily avoided. Such considerations may apply to certain Raman system installations. For example, Raman probe heads may be used to analyze petroleum products and other combustible materials. Raman subsystems, including devices that operate in potentially explosive environments, and devices that contain or may form ignition sources, should be enclosed such that safe operation can be ensured.

FIG. 1 shows a schematic of a Raman analysis system 100 suitable be used in an industrial plant environment. The system 100 may include a controller 102. In embodiments, the controller 102 may be a computer (e.g., a laptop computer), including a processor, with a display 103, for example. The controller 102 may include software executable on the controller 102 and configured to coordinate the operation of an excitation source 104, which emits excitation energy (e.g., light) that is transmitted to a probe 106 through an optical excitation fiber 112. In at least one embodiment, the excitation source 104 may be a narrowed-band laser such as a DPSS laser, as a non-limiting example.

The probe 106 may include optics and optical components adapted to convey a counter-propagating excitation/collection beam 118 of optical energy to and from a sample 120. For example, the optics of the probe 106 may include a sealed window 122 at a distal end of the probe 106 adjacent the sample 120. The sample 120 may include liquids, slurries, gases and/or solids, and the optics of the probe 106 may be selected with appropriate beam-forming and focusing optics for a particular composition of the sample 120. The excitation/collection beam 118 includes excitation energy of a selected wavelength from the excitation source 104.

The system 100 may further include a spectrograph 108 (i.e., optical spectrometer) in optical communication with the probe 106. Collected optical signals (e.g., optical energy) from the sample 120 are collected by the probe 106 and may be routed to the spectrograph 108 via an optical collection fiber 114. The collected optical signals include Raman scattering generated when the excitation energy in excitation/collection beam 118 impinges upon the sample 120. The spectrograph 108 is adapted to convert the collected optical signals into electrical signals representative of Raman spectra for viewing and analysis via the controller 102.

The system 100 may include an optical apparatus comprised of lenses, mirrors, other optics, filters, sealed windows, one or more probes, optical fibers and complementary connectors and support elements arranged, adapted and/or configured to convey the excitation energy from the excitation source 104 to the sample 120 under investigation and to convey optical energy collected from the sample 120 to a spectrograph 108. In at least one embodiment, the optical apparatus may include the excitation fiber 112, the collection fiber 114, the probe 104 and suitable complementary connectors and support elements.

Different types of signals imbedded within the collected optical signals may be distributed relative to the arrangement shown in FIG. 1. In certain embodiments, the excitation fiber 112 may be a single fiber that exhibits a relatively high energy content (e.g., relatively high power density). The excitation/collection beam 118 to and from the sample 120 may also possess a relatively high energy content because it includes the laser excitation energy focused into a beam. The collection fiber 114 may include a fiber bundle with a reduced energy content, at least lower than the excitation fiber 112. The excitation source 104 and the spectrograph 108 may be electrical connected to the controller 102 via paths 110 and 116, respectively, and the paths 110 and 116 may be low-energy electrical connections.

In at least one embodiment of the present disclosure, the optical apparatus may be configured for free space coupling of the excitation energy between the source 104 and the probe 106. For example, in certain embodiments, the source 104 and the probe 106 may be disposed within a common enclosure with free space coupling therebetween as described further herein. The benefits or advantages of such an embodiment may depend on the power density of the excitation energy, for example. Additionally or alternatively, in other embodiments, the optical apparatus may be configured for free space coupling of the optical signals collected from the sample 120 and the spectrograph 108.

In terms of explosion-proof and flameproof protection, the entire system 100 of FIG. 1 may be encased in an explosion-proof and/or flameproof enclosure, but such an enclosure is impractical and not cost-effective. Such an enclosure would be relatively large and, as discussed herein, the cost of the enclosure increases geometrically as enclosure size increases. In broad and general terms, one aspect of the present disclosure includes use of relatively small enclosures associated with particular subsystems of the system 100, depending upon the required size, the need for optical and/or electrical feedthroughs, the type and level of energy content, and other system characteristics. Enclosure configurations according to the present disclosure may further depend upon how the system 100 is configured for specific applications.

Figure 2:
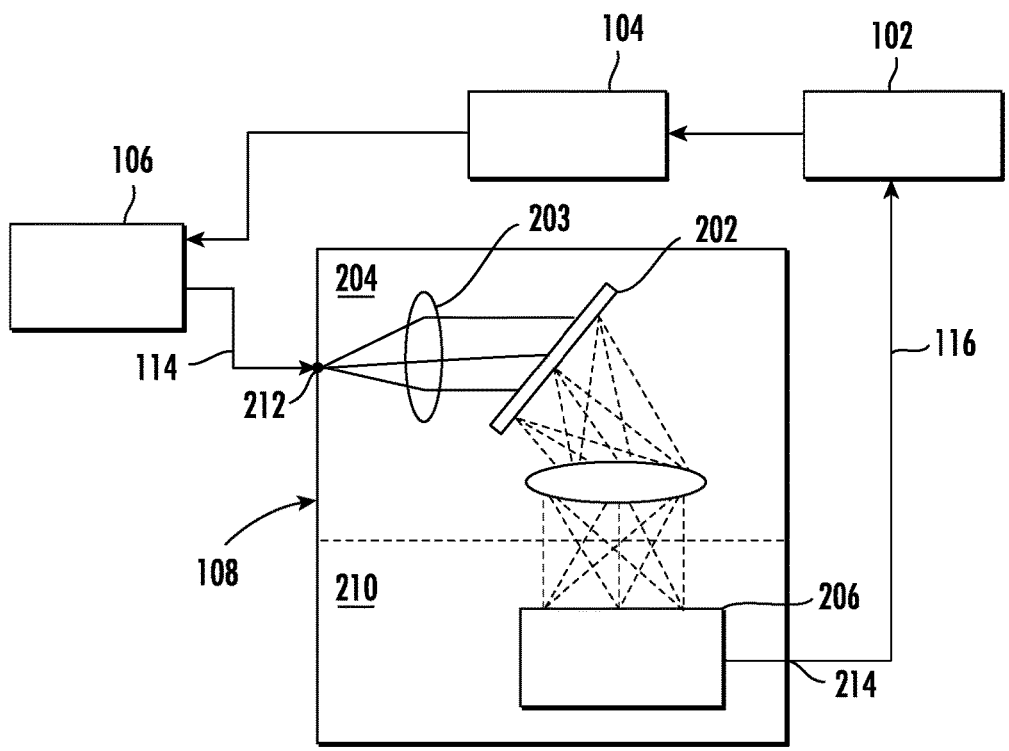
FIG. 2 shows a detailed schematic illustration of a spectrograph of the Raman spectroscopic system of FIG. 1, including an optics module and a detector module, according to the present disclosure.

FIG. 2 shows further details of the spectrograph 108, which may include two subsystem modules, including an optics module 204, including optics 203 and a diffraction grating 202, and a detector module 210, including a detector 206, which are generally delineated by a dashed line in FIG. 2. In embodiments, the optics module 204 and the detector module 210 may include further lenses, mirrors, filters, other optics and complementary connectors and support members configured to enable the capabilities of the optics module and the detector module described herein.

In at least one embodiment, the detector 206 may include a CCD detector or other type of suitable detector known in the art. The system 100 may include one enclosure adapted to encase both the optics module 204 and the detector module 210. In such an embodiment, at least an optical feedthrough and an electrical feedthrough may provide interfaces between the spectrograph 108 and other components of the system 100. For example, such an embodiment may include an optical feedthrough 212 at a point where the collection fiber 114 interfaces with the spectrograph 108, as shown in FIG. 2. Such an embodiment may further include an electrical feedthrough 214 at a point where the connecting path 116 interfaces with the spectrograph 108. While the optical feedthrough 212 and the electrical feedthrough 214 may carry relatively safe, lower-energy signals (e.g., relatively low power density), the enclosure containing both the optics module 204 and the detector module 210 would nevertheless be relatively large and in certain cases larger than necessary. Alternatively, the optical feedthrough 212 may include a window and suitable optical components to enable free space coupling between the probe 106 and the spectrograph 108, in which such embodiment the collection fiber 114 is omitted.

Figure 3:
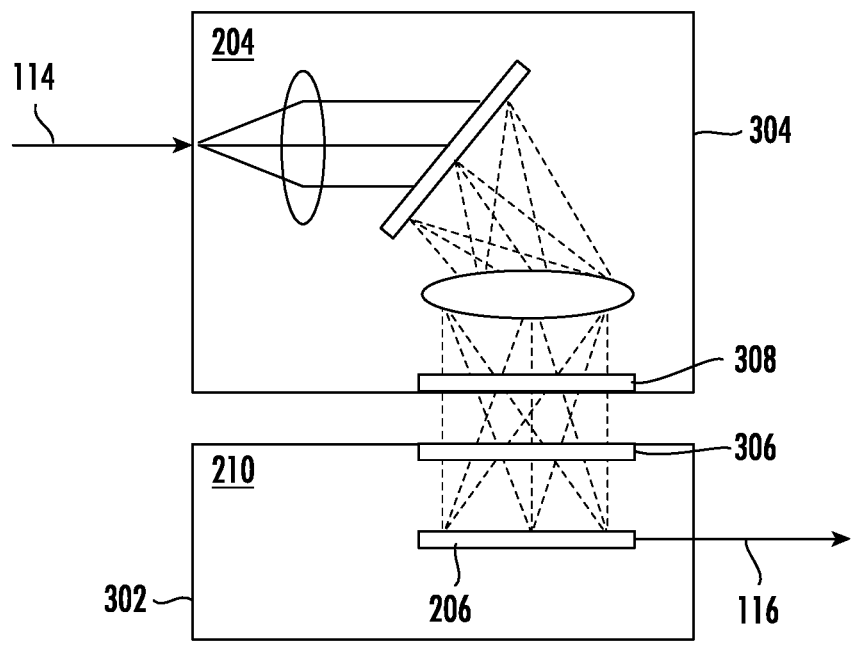
FIG. 3 shows a schematic illustration of a spectrograph of the Raman spectroscopic system of FIG. 1, including an optics enclosure and a detector enclosure, according to the present disclosure.

In at least one embodiment, the system 100 may include separate enclosures for the optics module 204 and/or the detector module 210. In at least one such embodiment, the detector module 210 may be situated in a separate enclosure from the rest of the spectrograph 108. As shown in FIG. 3, the detector module 210 may be contained in a detector enclosure 302 structured to meet the requirements of the applicable explosion-proof and/or flameproof industry standard, for example, ANSI/UL1203 and/or IEC 60079-1. The detector enclosure 302 isolates the detector module 210 from other components of the spectrograph 108, which may include only low-energy optical signals that do not need explosion- or flame-proofing. For example, in such an embodiment, the optics module 204, including the optics 203 and the grating 202, may be enclosed in an optics enclosure 304 to maintain a clean environment; however, the optics enclosure 304 may not need to be explosion-proof or flameproof due to the relatively low energy of the optical signals therein and due to the absence of any electrical signals.

The optics enclosure 304 may include a window 308 to enable the transmission (e.g., via free space coupling) of the optical signals from the optical module 204 within the optics enclosure 304 to the detector 206 of the detector module 210 within the detector enclosure 302 via a window 306. The windows 306 and 308 may be at least substantially transparent to the optical signals, for example, to the wavelengths of the optical signals. One skilled in the art, having the benefit of the present disclosure, is aware of means for integrating a window, such as the window 306, into an explosion-proof and/or flameproof enclosure, such as the detector enclosure 302.

Figure 4:
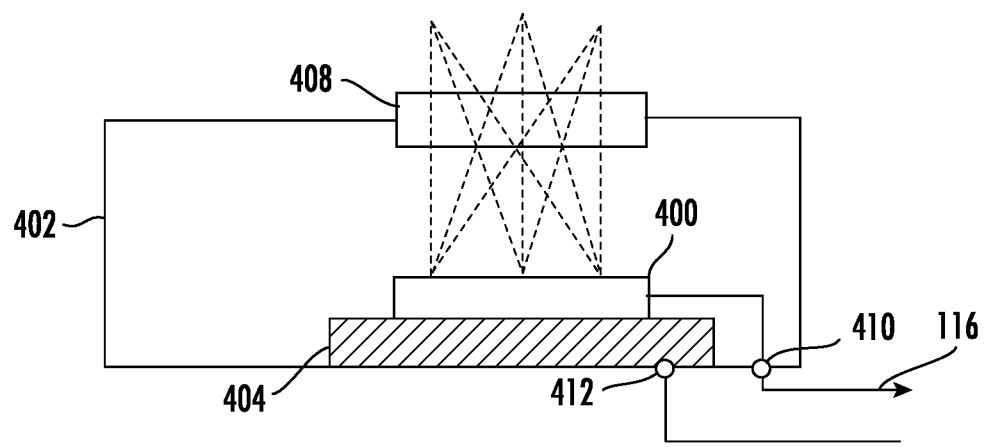
FIG. 4 shows a detailed schematic illustration of a detector enclosure according to the present disclosure.

A further advantage arises where the detector enclosure 302 requires a window for other purposes. As shown in FIG. 4, a detector 400 (e.g., a CCD camera) may be positioned within a dewar 402, which may include a thermoelectrical cooler 404 (e.g., a Peltier cooling device) adapted to lower the temperature of the dewar 402 and/or the detector 400 to reduce background radiation and dark current, which contribute noise to the electrical signals generated by the detector 400 from the optical signals. Such a dewar 402 may include a window 408, as described in pending U.S. Pat. No. 10,753,805, incorporated herein by reference in its entirety. In such an embodiment, the dewar 402 and the window 408 may be configured to meet explosion-proof and/or flameproof requirements. While such an embodiment requires feedthroughs 410, 412 for the output signals of the detector 400 and to power the thermoelectrical cooler 404, respectively, these are relatively low-power signals than may be combined into a single feedthrough.

Thus, according to at least one embodiment of the present disclosure, the dewar 402 used to enclose a cooled detector 400 of a Raman analysis system may also be an explosion-proof or flameproof enclosure, with the window 408, enabling spectral input (e.g., optical signals) to the detector 400, being a sealed window that meets the constraints and requirements of explosion-proof and/or flameproof protection standards.

The system 100 may include additional enclosures for other components and subsystems of the system 100, depending on the overall configuration of the system 100 and its application. For example, the probe 106 may be contained in an explosion-proof and/or flameproof enclosure. In such an embodiment, referring to FIG. 1, the window 122 may be a window of an explosion-proof and/or flameproof enclosure, at least somewhat analogous to the windows 306, 308. In further embodiments, the probe 106 may include a second window and suitable optical components (e.g., optical apparatus) configured for free space coupling of the probe 106 and the spectrograph 108 as to enable conveying the optical signals collected from the sample 120 to the spectrograph 108 without the collection fiber 114.

In further embodiments, the excitation source 104 and the controller 102 may be contained within a common explosion-proof and/or flameproof enclosure or within separate explosion-proof and/or flameproof enclosures, each embodiment including either feedthroughs and/or windows to enable and facilitate transmission and conveyance of signals and/or optical energy (e.g., via free space coupling) through the system 100. For example, in an embodiment of the system 100 in which the excitation source 104 is disposed within an explosion-proof and/or flameproof enclosure, such an enclosure may include both a feedthrough in communication with the controller 102 and a window in optical communication with the probe 106, in certain embodiments via the excitation fiber 112. Alternatively, such an enclosure housing of the excitation source 104 may include a feedthrough in optical communication with the probe 106 via the excitation fiber 112 and a wireless connection to the controller 102 as described further herein. In further embodiments, such an enclosure may include a window configured for free space coupling of the excitation energy of the excitation source 104 with the probe 106. Alternatively, in certain embodiments, the excitation source 104 and the probe 106 may be disposed within a common explosion-proof and/or flameproof enclosure.

In another aspect of the present disclosure, the number of feedthroughs, particularly electrical feedthroughs, may be reduced if not eliminated. For example, as shown in FIG. 1, spectral information from spectrograph 108 may be communicated to the controller 102 through connecting path 116. Such a communication path 116 may be relatively low power and thus, instead of a hard-wired electrical connection, may be a wireless communication connection (e.g., Bluetooth®, ZigBee®, WirelessHART® or other suitable protocol known in the art), thereby eliminating the need for a wiring feedthrough. In another embodiment, components of the system 100 may have WiFi or Internet connections including corresponding hardware, enabling the various subsystems to be included in an Internet-of-things (IoT) architecture. For example, the spectrograph 108 may include a wireless transmitter or transceiver configured for wireless communication, and the controller 102 may include a wireless receiver or transceiver compatibly configured for wireless communication with the spectrograph 108. In embodiments, the excitation source 104 may include wireless receiver or transceiver compatibly configured for wireless communication with the controller 102.

The controller 102 may be configured to perform further operations comprising a control structure to provide the functions described herein. In certain embodiments, the controller 102 forms a portion of a processing subsystem that includes one or more computing devices having memory, processing, and/or communication hardware. The controller 102 may be a single device or a distributed device, and the functions of the controller 102 may be performed by hardware and/or software. The controller 102 can include one or more Arithmetic Logic Units (ALUs), Central Processing Units (CPUs), memories, limiters, conditioners, filters, format converters, or the like which are not shown to preserve clarity. In at least one embodiment, the controller 102 is programmable to execute algorithms and process data in accordance with operating logic that is defined by programming instructions, such as software or firmware. Alternatively or additionally, operating logic for the controller 102 can be at least partially defined by hardwired logic or other hardware, for example, using an Application-Specific Integrated Circuit (ASIC) of any suitable type. The controller 102 can be exclusively dedicated to the functions described herein or may be further used in the regulation, control, and activation of one or more other subsystems or aspects of the Raman analysis system.

While various embodiments of a Raman analysis system and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. The present disclosure is not intended to be exhaustive or to limit the scope of the subject matter of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and thus remain within the scope of the present disclosure.

The invention claimed is:

1. A Raman analysis system, comprising:
an excitation source adapted to generate excitation radiation;
an optical apparatus configured to transmit the excitation radiation to a sample under investigation and to convey optical energy collected from the sample to a spectrograph, wherein the collected optical energy includes a Raman spectrum of the sample;
the spectrograph including an optical grating, operative to separate the optical energy collected from the sample into a Raman spectral signal, and a detector configured to receive the Raman spectral signal and convert the Raman spectral signal into an electrical signal representative of the Raman spectrum of the sample;
a controller in communication with the spectrograph, the controller configured to receive the electrical signal from the detector to display and/or store the Raman spectrum of the sample; and
at least one flame-resistant or explosion-resistant enclosure, wherein at least a portion of the spectrograph is disposed in the at least one enclosure and separate from other components of the Raman analysis system, wherein:
the optical grating of the spectrograph is disposed in a flame-resistant or explosion-resistant first enclosure of the at least one enclosure, the first enclosure including a first sealed window;
the detector of the spectrograph is disposed in a flame-resistant or explosion-resistant second enclosure of the at least one enclosure, the second enclosure including a second sealed window; and
the Raman spectral signal from the optical grating is transmitted to the detector through the first sealed window and second sealed window.

2. The Raman analysis system of claim 1, further comprising:
an excitation optical fiber adapted for transmitting the excitation radiation from the excitation source to a remote optical probe head, the probe head configured to collect the optical energy from the sample; and
a collection optical fiber adapted for conveying the collected optical energy from the probe head to the spectrograph,
wherein the at least one enclosure includes an optical feedthrough configured to enable the optical energy collected from the sample to be transmitted to the optical grating while further facilitating the flame-resistance or explosion-resistance of the at least one enclosure.

3. The Raman analysis system of claim 1, wherein the at least one enclosure includes an electrical feedthrough configured to enable the electrical signal from the detector to be conveyed to the controller while maintaining the flame-resistance or explosion-resistance of the at least one enclosure.

4. The Raman analysis system of claim 1, further comprising a thermoelectric cooling device disposed in the second enclosure and configured to cool the detector and/or the second enclosure as to reduce thermally induced noise in the electrical signal,
wherein the second sealed window is configured both to enable the flame resistance or explosion resistance of the second enclosure and to maintain the cooling within the second enclosure.

5. The Raman analysis system of claim 4, wherein the second enclosure includes:
a first electrical feedthrough configured to provide electrical control signals to control the cooling device; and
a second electrical feedthrough configured to enable conveying the electrical signals from the detector to the controller.

6. The Raman analysis system of claim 4, further comprising a wireless communications transmitter or a first transceiver disposed in the second enclosure and configured to transmit a wireless signal representative of the electrical signals from the detector to the controller, which includes a wireless communications receiver or a second transceiver.

7. The Raman analysis system of claim 1, wherein the excitation source is disposed within another flame-resistant or explosion-resistant enclosure, which includes a window and optics configured to convey the excitation radiation to the sample under investigation.

8. The Raman analysis system of claim 1, further comprising a remote optical probe head configured to collect the optical energy from the sample and disposed within another flame-resistant or explosion-resistant enclosure, which includes a window configured to convey the collected optical energy from the probe head to the spectrograph.

9. The Raman analysis system of claim 1, wherein the excitation source and the controller are disposed within a common flame-resistant or explosion-resistant enclosure.

10. A Raman analysis system, comprising:
an excitation source configured to output excitation radiation;
an optical apparatus operative to deliver the excitation radiation to a sample under investigation and to convey optical energy collected from the sample to a spectrograph of the system;
the spectrograph, including an optical grating operative to separate the optical energy collected from the sample into a Raman spectral signal;
a detector configured to receive the Raman spectral signal and to convert the Raman spectral signal into an electrical signal representative of a Raman spectrum of the sample; and
a controller in communication with the detector, the controller operative to receive the electrical signal from the detector and to display or store the Raman spectrum of the sample,
wherein two or more of the excitation source, spectrograph, detector and controller are in separate, corresponding flame-resistant or explosion-resistant enclosures, wherein:
the optical grating of the spectrograph is disposed in a corresponding flame-resistant or explosion-resistant first enclosure, the first enclosure including a first sealed window;
the detector is disposed in a corresponding flame-resistant or explosion-resistant second enclosure, the second enclosure including a second sealed window; and
the Raman spectral signal from the optical grating is transmitted to the detector through the first sealed window and second sealed window.

11. The Raman analysis system of claim 10, wherein at least one of the two or more flame-resistant or explosion-resistant enclosures includes a wireless communications transmitter, receiver or transceiver configured to convey a wireless signal from the at least one enclosure to a different one of the two or more flame-resistant or explosion-resistant enclosures.

* * * * *